(12) United States Patent
Paakkinen

(10) Patent No.: US 8,915,077 B2
(45) Date of Patent: Dec. 23, 2014

(54) WAVE POWER PLANT

(75) Inventor: Heikki Paakkinen, Espoo (FI)

(73) Assignee: Wello Oy, Espoo (FI)

( * ) Notice: Subject to any disclaimer, the term of this patent is extended or adjusted under 35 U.S.C. 154(b) by 709 days.

(21) Appl. No.: 13/119,424

(22) PCT Filed: Sep. 23, 2009

(86) PCT No.: PCT/FI2009/050758
§ 371 (c)(1),
(2), (4) Date: Mar. 29, 2011

(87) PCT Pub. No.: WO2010/034888
PCT Pub. Date: Apr. 1, 2010

(65) Prior Publication Data
US 2011/0265468 A1 Nov. 3, 2011

(30) Foreign Application Priority Data
Sep. 26, 2008 (FI) ...................................... 20085911

(51) Int. Cl.
*F03B 13/16* (2006.01)
*F03B 13/12* (2006.01)
*F03B 13/20* (2006.01)

(52) U.S. Cl.
CPC ............. *F03B 13/20* (2013.01); *F05B 2240/93* (2013.01); *Y02E 10/38* (2013.01)
USPC ................... 60/499; 290/42; 290/53; 60/498; 60/501

(58) Field of Classification Search
USPC ................................. 60/495–507; 290/42, 53
See application file for complete search history.

(56) References Cited

U.S. PATENT DOCUMENTS

| 524,490 A | 8/1894 | Singer et al. |
| 1,584,293 A | 5/1926 | Hegenbarth |

(Continued)

FOREIGN PATENT DOCUMENTS

| JP | S60-230567 A | 11/1985 |
| JP | 62118066 | 5/1987 |

(Continued)

OTHER PUBLICATIONS

Extended European Search Report issued Mar. 20, 2013 in corresponding European Application No. 09815731.6.
Notice of Reasons for Rejection mailed Sep. 2, 2013 in corresponding JP Application No. 2011-528379.

*Primary Examiner* — Thomas Denion
*Assistant Examiner* — Jessica Kebea
(74) *Attorney, Agent, or Firm* — Knobbe Martens Olson & Bear LLP

(57) ABSTRACT

The invention relates to a wave power plant, comprising at least one floating power plant body and means for converting movement of the floating power plant body into a rotary motion for power take off. The floating power plant body (1) is adapted to perform a gyrating motion in response to waves. For generating or enhancing the gyrating motion, the power plant body (1) is provided with one or more of the following elements: a flange-shaped weight (2), which is eccentrically suspended to the floating power plant body (1) and which lies below a waterline (13) of the floating power plant body at a substantial distance from the waterline; one or more transverse flanges (4), which is or are mounted on the floating power plant body in a substantially crosswise position relative to a propagation direction (A) of waves; and a flywheel (11), whose rotating axis lies substantially on a gyraion shaft (5) of the floating power plant body or on a separate vertical shaft and whose gyro force deflects the turning motion of the floating power plant body.

11 Claims, 2 Drawing Sheets

(56) References Cited

U.S. PATENT DOCUMENTS

| | | |
|---|---|---|
| 1,682,176 A | 8/1928 | Hegenbarth |
| 3,231,749 A | 1/1966 | Hinck, III |
| 4,266,143 A | 5/1981 | Ng |
| 7,375,436 B1 | 5/2008 | Goldin |
| 2008/0093858 A1* | 4/2008 | Hench .............................. 290/53 |
| 2008/0224472 A1 | 9/2008 | Bean |
| 2009/0127856 A1* | 5/2009 | Hench .............................. 290/42 |

FOREIGN PATENT DOCUMENTS

| | | |
|---|---|---|
| WO | WO 2005/071257 A1 | 8/2005 |
| WO | WO 2008/051642 A2 | 5/2008 |
| WO | PCT/IF2008/050145 | 10/2008 |

* cited by examiner

WAVE POWER PLANT

CROSS REFERENCE TO RELATED APPLICATIONS

This application claims the benefit and priority to and is a U.S. National Phase of PCT International Application Number PCT/FI2009/050758, filed on Sep. 23, 2009. This application claims the benefit and priority to Finnish Application No. FI20085911, filed on Sep. 26, 2008. The disclosures of the above-referenced applications are hereby expressly incorporated by reference in their entirety.

The invention relates to a wave power plant, comprising at least one floating power plant body and means for converting movement of the floating power plant body into a rotary motion for power takeoff.

Publication U.S. Pat. No. 4,266,143 discloses a wave power producing apparatus, wherein the objective is to convert the pendulum-like swinging motion of a floating tank into the rotating motion of a rotator. Because of the irregular movement and varying size of waves, it has been difficult or impossible to convert this pendulum-like swinging motion into continuous rotating motion with a high efficiency.

It is an object of the invention to provide a new type of wave power plant, wherein the pendular movement of waves is converted with a high efficiency directly into continuous rotating motion.

This object is achieved with the invention on the basis of the characterizing features presented in the appended claim 1. Preferred embodiments of the invention are presented in the dependent claims.

The underlying concept of the invention is to bring a floating power plant body to perform a gyrating movement directly in response to waves, the invention introducing means, by which the waves are caused to generate a gyrating motion or by which the wave-generated gyrating motion is enhanced.

Figure 1:
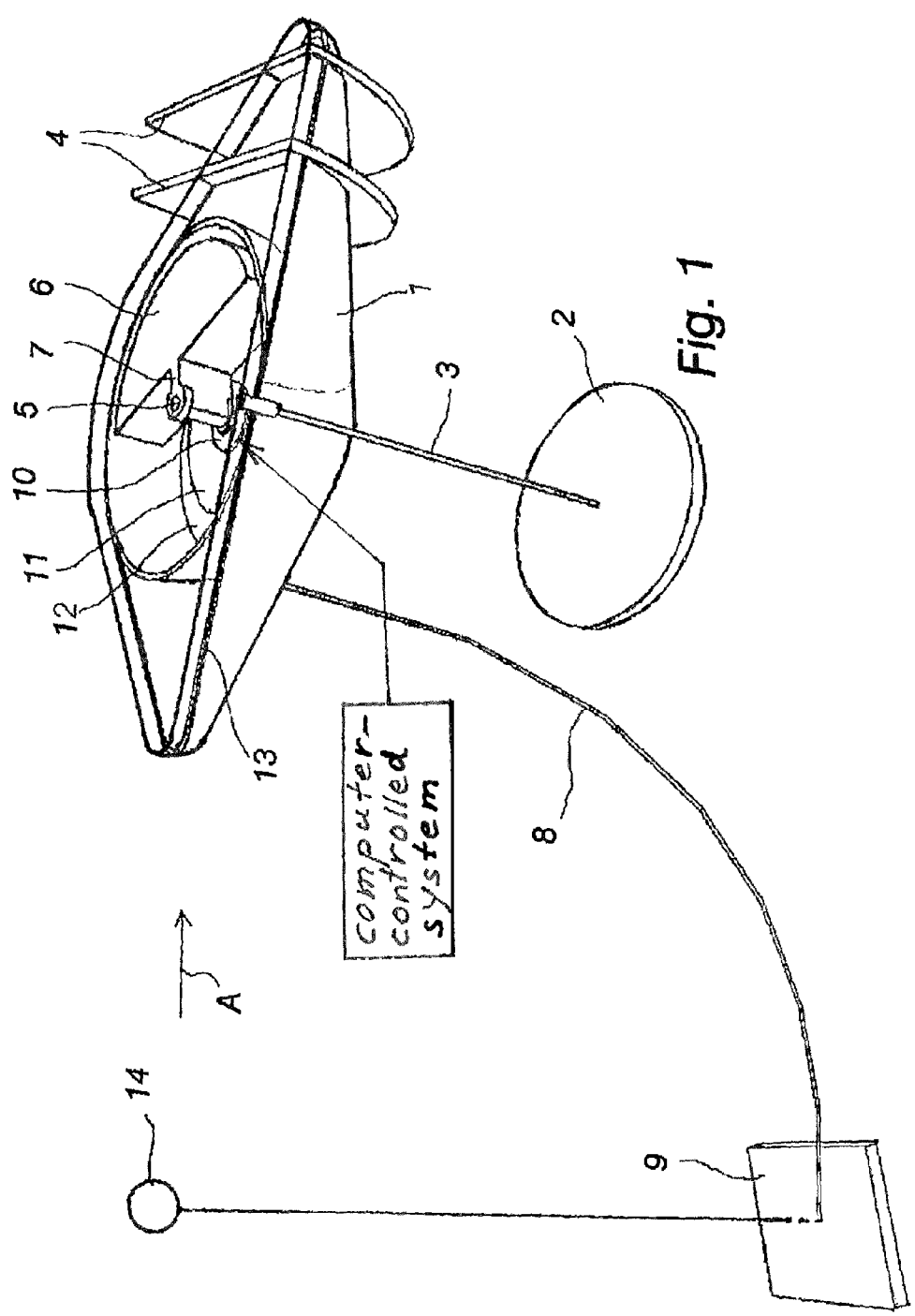

One exemplary embodiment of the invention will now be described in more detail with reference to the accompanying drawing, in which FIG. 1 shows in a perspective view a wave power plant according to one preferred embodiment of the invention, the power plant body having its top opened.

Figure 2:
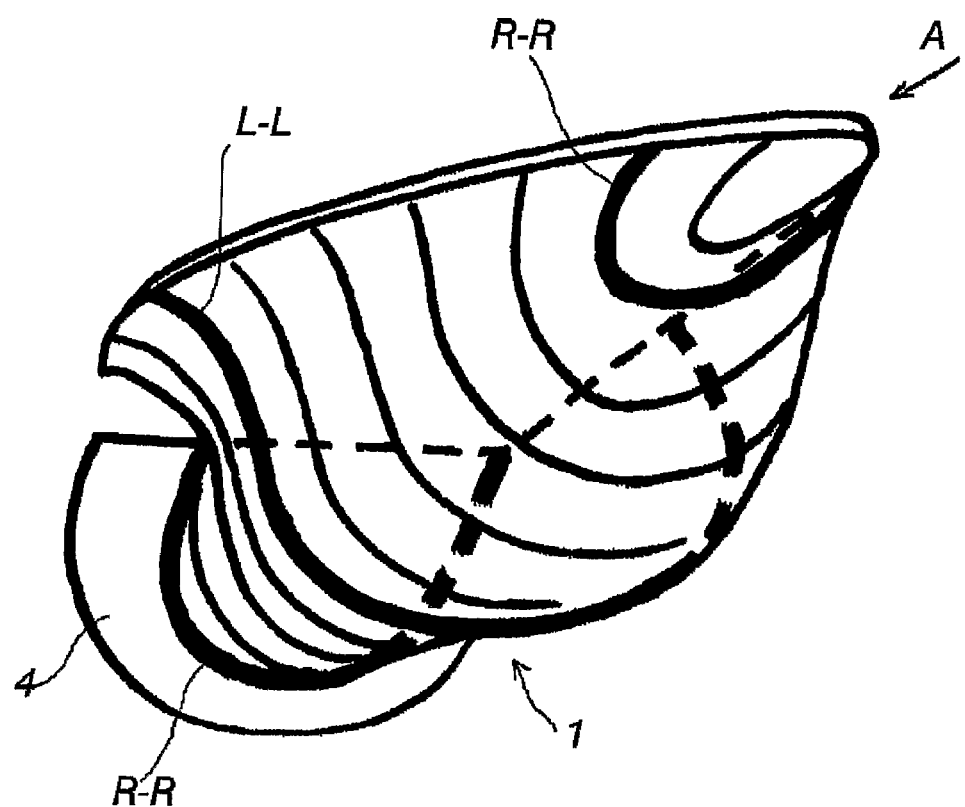

FIG. 2 shows in a perspective view, seen from the front and obliquely from below, a preferred design for the power plant body of a wave power plant.

In the present case, the floating body of a wave power plant comprises a pontoon or float. The rotating parts of a power plant, discussed in more detail later, are located inside this shell type body.

A floating power plant body 1 is elongated and arcuate, which shape in its part assists in the generation of gyrating motion as an incoming direction A of waves is substantially in line with the body's longitudinal direction or slightly offset from that direction, resulting in an acute angle between the incoming direction A of waves and the body's longitudinal direction.

According to the underlying concept of the invention, the floating power plant body 1 is adapted to perform a gyrating motion directly in response to waves, enabling the gyrating motion to be utilized for setting a rotator 6 in rotating motion.

In FIG. 2 is depicted a design for the power plant body 1, which is preferred in view of generating a gyrating motion. The power plant body 1 features, near its forward end (in the incoming direction A of waves), level with the waterline, i.e. close to the power plant body's top edge, a cross-section profile R-R, which is inclined on either side of the body in one direction, i.e. to the right as viewed in the propagation direction of waves. A cross-sectional curve L-L, present in a middle section of the body 1, is inclined in the opposite direction, i.e. to the left. Also in this case, the body has its both sides inclined to the left, as indicated by a dashed-line portion of the curve L-L. A cross-sectional curve R-R, present at a rearward end of the body, is again inclined to the right on either side of the body.

The functional effect of a zone-to-zone varying inclination in the body's cross-section is based on the following:

1. When the body lies/floats in the trough of a wave, the water surface is arcuate with the result that the body's forward and rearward parts are deeper in water than the body's middle part. Because the middle part of the body, when viewed from the front, is at the waterline level inclined to the left, the application point of buoyancy shifts to the right as the water level falls in this area. Respectively, in the forward and rearward parts, as the body is inclined to the right at the waterline level, the application point of buoyancy shifts also to the right as water rises in these areas.
2. When the body lies on the crest of a wave, the water surface arches to be higher at the body's middle section and lower at the ends. As the water level with respect to the body shifts in opposite directions relative to what was described above, the effect of buoyancy shifts also in the opposite direction, i.e. to the left in the middle section.

Because the body mass remains stationary and the application point of buoyancy shifts to the left and right, at certain stages of a wave there is developed a shifting buoyant force which generates swinging. It is this, together with the thudding effect (pitching) caused by a wave, which generates gyration.

The body's curvature and the subsequently described weight and gyro force thereof have each also a gyration promoting effect at a respective stage of a wave. Thus, each of these effects supports one another and assists in the generation of a gyrating motion as smooth and powerful as possible in diverse wave conditions.

In a preferred embodiment, the power takeoff elements include a rotator 6, which is bearing-mounted for rotation around a gyration shaft 5 and which has its center of gravity at a distance from the gyration shaft 5. The rotator 6 is linked to the gyration shaft 5 with a moment arm 7 of desired length.

It has been realized in the invention that gyrating motion of the body 1 can be generated directly from the movement of waves and the wave-generated gyrating motion can be enhanced with subsequently described elements.

Alongside the floating power plant body 1 is suspended a heavy horizontal flange 2 set in the depth of about a ½ wavelength. The body 1 is in turn weighted asymmetrically with an inclination to tilt onto the side away from the flange 2. The flange 2 and the weighting of the body 1 balance each other out, whereby, in calm water, the power plant floats in such a way that the rotator 6 has its shaft 5, which is at the same time the gyration shaft, in a vertical position. The fact that the flange 2 opposes an up-and-down movement creates a lateral swinging force which, together with a swinging force longitudinal of the wave, produces a gyrating motion. The length of a suspension chain or cable 3 supporting the flange 2 is adjustable for enabling the adjustment of its depth from a waterline 13 to equal about ½ of the length of a wave or some other depth for providing the effect of a desired magnitude.

Gyrating motion is also assisted by one or more transverse flanges 4, which is or are mounted on the power plant body 1 substantially crosswise to the propagating direction A of waves. The transverse flange or flanges 4 is or are located at a distance from the gyration shaft 5, downstream of the gyration shaft in the propagating direction A of waves. The flange or flanges 4 prevent the floating power plant body 1 from going along with the wave in an accelerating motion, which falls exactly on such a point at which the body's 1 movement would oppose rotation of the rotator 6 in response to gyrating motion. Thus, by virtue of the flanges 4, a horizontal movement of the body 1 is principally disallowed and the body 1 moves mainly in a vertical direction in response to the buoyancy of waves, the vertical movement nevertheless occurring asynchronously on various sides of the gyration shaft 5, thus generating a gyrating motion.

The gyrating motion can also be promoted with a flywheel 11 having a substantially vertical rotating axis. The flywheel 11 can be present on the same shaft as the rotator 6 or on a separate shaft. The flywheel 11 can derive its rotational energy by way of an increasing gear 10 from the rotator 6. The flywheel 11 can also be driven by means of a separate (electric) motor. The flywheel 11 has its gyro force deflecting the body's 1 turning action, whereby the wave-generated pitch produces also sideways swinging. The combined effect of these movements generates a gyrating motion. In other words, the gyro force opposes a wave-generated external force and a longitudinal tilting of the body, which at the same time urges to tilt the gyro, but the gyro translates the external force into a lateral rotation and achieves a lateral swinging of the body. The tilting gyro force is at its maximum as the pitching is at its fastest, i.e. on the crest and in the trough of a wave. At this point, the body's listing is also at its maximum.

The wave power plant includes preferably a computer-controlled RPM stabilizer for the rotator 6. The wide-range fluctuation in the RPM of the rotator 6 is a problem. A large wave causes a rush, which often ends up in a "counter-hill" as the rotator is in a wrong phase with respect to the next wave. The computer-controlled RPM stabilizer monitors the rotating speed of the rotator and allows its fluctuation within a set range, e.g. not more than 10% per revolution. If the rotating speed tends to increase faster than the set value, the automatics shall operate to increase the resistance of a generator. If the RPM tends to decrease faster than what has been determined, the resistance of a generator 12 will be decreased or the rotating speed of the rotator 6 is even increased by feeding energy into the generator.

By virtue of the RPM stabilizing system, the rotation of the plant's rotating parts is smoother and more continuous. Stoppages do not occur and, thus, the energy output is also increased.

Alternatively or additionally, the flywheel 11 may also function as an RPM stabilizer. The massive, high-speed rotating flywheel 11, linked to the rotator 6 by way of the gear 10, can be used as a stabilizer for RPM fluctuations the same way as a computer-controlled RPM stabilizer mentioned above. While rotating around a vertical axis, the flywheel 11 provides at the same time a gyro effect as mentioned above. The generator 12 can be connected with the flywheel 11. The increasing gear 10 can be continuously variable and automatics may take care of the gear ratio regulation so as to achieve a sufficient RPM stabilization for the rotator 6.

It is also preferred that the rotator's 6 phase angle with respect to the gyrating motion be optimized by computer control. The computer-controlled phase angle optimizer is a system which monitors the rotator's 6 location in relation to an inclination of the power plant body 1 and endeavors to maintain the phase angle averagely at an optimum. In terms of the output of energy, the most preferred condition would be to have the rotator 6 follow behind the inclination of the gyration shaft 5 with a phase difference of about 90°. This is where the rotator's 6 torque moment is at its maximum. The computer-operated phase angle optimizer may also receive advance information about an incoming wave from a wave height or acceleration measuring buoy/sensor 14 positioned in front of the apparatus in the incoming direction of waves.

All of the described functions relate to the rotator's 6 rotation achieved by means of gyration either by promoting the wave-generated gyrating motion or by independently converting the movement of waves into a gyrating motion, which in turn can be used for rotating the rotator 6. Accordingly, it is possible to employ various combinations of the described functions or all of the functions can be utilized in a single floating power plant. The described functions enable providing a stable-in-motion and high-yield power plant.

The preferred exemplary power plant may feature the elongated arcuate float body 1, which is further provided with the heavy flange 2 suspended alongside the body and with the flywheel 11 as an RPM stabilizer, in addition to which the RPM fluctuations can be stabilized by a load of the generator 12 or by an adjustment of the increasing gear 10 while a phase difference between the rotator's 6 rotation and the body's 1 gyrating motion is optimized by means of computer control.

The invention is not limited to the presented exemplary embodiment as structural details may vary in many ways. For example, the power plant body may consist of several interconnected floats and the takeoff of power can be performed by something other than a heavy rotator, for example by means of an angular shaft as described in the Applicant's earlier patent application PCT/FI2008/050145. The gyro force enables implementing a totally symmetrical gyrating power plant body, although the efficiency can be increased by an appropriate asymmetry of the shape or construction, by means of which the vertical buoyancy of propagating waves is adapted to work at alternate times on alternate sides of the body. Also, the underwater horizontal flange enables implementing a symmetrical gyrating body. In a high-performance power plant it is possible to provide a single very large body with a plurality of gyrating units as described, which could be mounted on a common body e.g. by means of springs.

The invention claimed is:

1. A wave power plant, comprising:
    at least one floating power plant body having a forward end, intended to face the propagation direction of the waves, a rearward end and a middle section therebetween,
    a weight, which is eccentrically suspended from the floating power plant body and which lies below a waterline of the floating power slant body at a distance from the waterline so as to oppose up and down movement of the body,
    a system for converting movement of the floating power plant body into a rotary motion for power takeoff comprising a rotator, which is bearing-mounted for rotation around an upright gyration shaft and which as its center of gravity at a distance from the gyration shaft, and
    a computer-controlled system configured to optimize output energy by having the rotator follow behind an inclination of the gyration shaft,
    wherein the floating power plant body is adapted to perform a gyrating motion in waves with the cooperation of a swinging motion generated by the buoyant force of waves,
    the gyrating motion is a combination of swinging motions in lateral and longitudinal directions of the power plant body caused by the swinging motion generated by the buoyant force of waves, and
    the floating power plant body is provided with further comprises one or more transverse flanges, which is or are mounted on outside the floating power plant body in a crosswise position relative to a propagation direction of waves, said transverse flange or -flanges is or are located at a distance from the ration shaft downstream of the gyration shaft in the propagation direction (A) of waves.

2. A wave power plant as set forth in claim 1, wherein a cross section profile of the power plant body is obliquely inclined in a first direction at the forward end and then in a second direction opposite to the first direction at the middle section and again in the first direction at the rearward end, whereby the buoyant force of waves results in the pitching and rolling of the power plant body for generating a gyrating motion directly in response to waves.

3. A wave power plant as set forth in claim 2, wherein said cross section profile inclining obliquely in the first direction is present at the forward and rearward ends of the power plant body as viewed from the forward end, and said cross section profile inclining obliquely in the second direction is present at the middle section of the power plant body.

4. A wave power plant as set forth in claim 1, wherein the computer-controlled system is further configured to stabilize a rotating speed of the rotator.

5. A wave power plant as set forth in claim 1, wherein the wave power plant body is a pontoon or float, which is elongated and arcuate.

6. A wave power plant as set forth in claim 1, wherein a suspension chain or cable for the weight is adjustable in terms of its length.

7. A wave power plant as set forth in claim 1, wherein the floating power plant body is weighted asymmetrically, such that the weighting compensates for an inclination inflicted by the weight, whereby in calm water the rotator's shaft, and respectively the gyration shaft, is in an upright position.

8. A wave power plant as set forth in claim 1, wherein the floating power plant body constitutes a shell type housing for the wave power plant, wherein the rotator is located in the shell type housing.

9. A wave power plant as set forth in claim 1, wherein the computer-controlled system is further configured to receive advance information about an incoming wave from a wave height or acceleration measuring buoy/sensor positioned in front of the wave power plant in the incoming direction of waves.

10. A wave power plant as set forth in claim 1, wherein the wave power plant body further comprises a flywheel, whose rotating axis lies on the upright gyration shaft of the floating power plant body or on a separate upright shaft and whose gyro force deflects the turning motion of the floating power plant body in the longitudinal direction thereof, which caused by the swinging motion generated by the buoyant force of waves, into the lateral direction of the power plant body.

11. A wave power plant as set forth in claim 10, wherein the floating power plant body constitutes a shell type housing for the wave power plant, wherein the flywheel is located in the shell type housing.

* * * * *